United States Patent
Hsu et al.

(10) Patent No.: US 11,194,343 B2
(45) Date of Patent: Dec. 7, 2021

(54) SELF-DRIVING-GOLF-CART DRIVING PATH CENTRAL CONTROLLING DEVICE

(71) Applicant: SUNRISE RESORT, INC., Taipei (TW)

(72) Inventors: Tien-Ya Hsu, Taipei (TW); You-Peng Jhang, Taichung (TW); Yu-Yuan Hsieh, Taichung (TW); Yu-Jun Huang, Hualien County (TW)

(73) Assignee: SUNRISE RESORT, INC., Taipei (TW)

( * ) Notice: Subject to any disclaimer, the term of this patent is extended or adjusted under 35 U.S.C. 154(b) by 202 days.

(21) Appl. No.: 16/536,208

(22) Filed: Aug. 8, 2019

(65) Prior Publication Data

US 2020/0341489 A1    Oct. 29, 2020

(30) Foreign Application Priority Data

Apr. 24, 2019    (TW) ................. 108114223

(51) Int. Cl.
　　*G05D 1/02*　　(2020.01)
　　*G05D 1/00*　　(2006.01)

(52) U.S. Cl.
　　CPC ......... *G05D 1/0287* (2013.01); *G05D 1/0088* (2013.01); *G05D 1/0212* (2013.01); *G05D 1/0276* (2013.01); *G05D 2201/0204* (2013.01)

(58) Field of Classification Search
　　CPC .. G05D 1/0287; G05D 1/0088; G05D 1/0212; G05D 1/0276; G05D 2201/0204; G05D 1/0297; A63B 2225/305; A63B 2055/605; A63B 2225/50; A63B 55/61; A63B 69/3691; G08G 1/096811; G08G 1/096833; G08G 1/096725
　　See application file for complete search history.

(56) References Cited

U.S. PATENT DOCUMENTS

| | | | |
|---|---|---|---|
| 5,410,480 A * | 4/1995 | Koseki ................. | G05D 1/0265 180/167 |
| 2018/0173223 A1* | 6/2018 | Doane ...................... | G08G 1/16 |
| 2019/0155274 A1* | 5/2019 | Lee ........................ | A63B 55/61 |

* cited by examiner

*Primary Examiner* — Rodney A Butler
(74) *Attorney, Agent, or Firm* — Maschoff Brennan

(57) ABSTRACT

Disclosed is a self-driving-golf-cart driving path central controlling device comprising a self-driving-golf-cart driving path determining module, a self-driving-golf-cart driving path excluding module and a central controlling module, the self-driving-golf-cart driving path central controlling device determines, from a plurality of self-driving-golf-cart driving paths, an individual self-driving-golf-cart driving path for each self-driving-golf-cart and controls each self-driving-golf-cart to drive, in a self-driving manner, on the individual self-driving-golf-cart driving path which is determined for said each self-driving golf-cart.

6 Claims, 5 Drawing Sheets

SELF-DRIVING-GOLF-CART DRIVING PATH CENTRAL CONTROLLING DEVICE

FIELD OF THE INVENTION

The present invention relates to a self-driving car, and more particularly relates to a self-driving-golf-cart driving path central controlling device for controlling self-driving-golf-carts to self-driving in a golf course.

BACKGROUND OF THE INVENTION

A self-driving car, also called a driverless car or an autonomous car, is a vehicle capable of driving itself according to environment sensing result without human control. In recent years, with the continuous efforts in technique of decision-making, command transmission and mechanism action of vehicles, the self-driving cars has made rapid progress.

At present, the self-driving car technology has not yet been applied to a golf buggy, i.e., a golf cart, for driving inside a golf course, but merely could be seen in an out-course application that buries guiding wires in the asphalt road out of the golf course with sensing elements buried at specific positions along the guiding wires, which are also disposed in the asphalt road out of the golf course, to detect a corresponding sensing element installed in a golf-cart, thereby enabling the golf-cart to: (1) automatically stop or continue to drive by automatic sensing while reaching any specific positions of the sensing elements; (2) manually control the golf cart to drive or stop by a caddy's remote controller; or (3) manually control the golf cart to drive or stop by pushing a self-driving button in the golf-cart. There is not any conventional technologies applying a self-driving car, capable of sensing environmental condition, to drive inside the golf course including fairway and rough, because in the conventional technology, which only allocates the golf-cart only to drive on the asphalt road outside the fairway and rough, the environment and the road conditions of the asphalt road outside the golf course are too simple to require a self-driving function for a golf car. Therefore, it is an issue to further apply self-driving carts to drive in a golf course.

SUMMARY OF THE INVENTION

Accordingly, an objective of the present invention is to provide a self-driving-golf-cart driving path central controlling device, which arranges self-driving-golf-cart driving paths on a fairway and/or a rough of a golf course to determine and manage the self-driving-golf-cart driving paths in the fairway and/or a rough in a central control manner. That is, the present invention provides the self-driving-golf-cart driving paths for the self-driving-golf-carts self-driving to drive in the fairway and/or a rough of the golf course and, in the central control manner, determines and manages the self-driving-golf-cart driving paths in the fairway and/or a rough. The present invention solves the problem that the fairway of the golf course is too delicate and fragile to bear any car's repeated driving. Furthermore, the present invention performs control and management in the central control manner to determine daily self-driving-golf-cart driving paths according to various conditions of the fairway, including a condition that some areas of the fairway are under maintenance or construction, or a condition that considers daily self-driving-golf-cart amount. Moreover, the present invention can evenly distribute the self-driving-golf-carts over the self-driving-golf-cart driving paths to perform an effective control and management for the self-driving-golf-cart driving paths.

In order to overcome the technical problems in prior art, the present invention provides a self-driving-golf-cart driving path central controlling device that centralizing controls a plurality of self-driving-golf-carts to self-drive in a self-driving area, the self-driving area is a fairway of a golf course, the self-driving-golf-cart driving path central controlling device comprising: a self-driving-golf-cart driving path determining module configured to determine a plurality of self-driving-golf-cart driving paths within the self-driving area, wherein the plurality of self-driving-golf-cart driving paths are provided such that each self-driving-golf-cart drives on one of the plurality of self-driving-golf-cart driving paths; a self-driving-golf-cart driving path excluding module, connected to the self-driving-golf-cart driving path determining module, configured to assign an excluded self-driving-golf-cart driving path from the plurality of self-driving-golf-cart driving paths if an excluding assignment is required, wherein the plurality of self-driving-golf-cart driving paths from which the self-driving-golf-cart excluded driving path/paths is/are excluded are defined as selected self-driving-golf-cart driving paths, and the excluded self-driving-golf-cart driving path is optional to be configured to be re-assigned to be the selected self-driving-golf-cart driving path; and a central controlling module, connected to the self-driving-golf-cart driving path determining module and the self-driving-golf-cart driving path excluding module, configured to obtain the selected self-driving-golf-cart driving paths from the self-driving-golf-cart driving path excluding module such that the central controlling module determines, from the selected self-driving-golf-cart driving paths, an individual self-driving-golf-cart driving path for each self-driving-golf-cart and controls each self-driving-golf-cart to drive, in a self-driving manner, on the individual self-driving-golf-cart driving path which is determined for said each self-driving golf-cart.

In one embodiment of the present invention, a self-driving-golf-cart driving path central controlling device is provided, wherein the central controlling module is configured to select all or a portion of the selected self-driving-golf-cart driving paths from the selected self-driving-golf-cart driving paths as candidate self-driving-golf-cart driving paths from which the individual self-driving-golf-cart driving path for each self-driving-golf-cart is selected such that the central controlling module controls each self-driving-golf-cart to drive, in a self-driving manner, on the individual self-driving-golf-cart driving path determined.

In one embodiment of the present invention, a self-driving-golf-cart driving path central controlling device is provided, wherein the central controlling module is configured to select the candidate self-driving-golf-cart driving paths according to a daily self-driving-golf-cart amount and/or a self-driving area maintenance plan.

In one embodiment of the present invention, a self-driving-golf-cart driving path central controlling device is provided, wherein the central controlling module is configured to select the self-driving-golf-cart driving path from the candidate self-driving-golf-cart driving paths in a probability-evening manner according to self-driving-golf-cart dispatching information of each self-driving-golf-cart to be dispatched.

In one embodiment of the present invention, a self-driving-golf-cart driving path central controlling device is provided, wherein the central controlling module includes: a numbering unit, connected to the self-driving-golf-cart driving path determining module and the self-driving-golf-cart driving path excluding module, configured to number each candidate self-driving-golf-cart driving path of the candidate self-driving-golf-cart driving paths by natural numbers beginning with 0; a remainder calculating unit, connected to the numbering unit, configured to obtain a remainder of a dispatching number of the self-driving-golf-cart divided by a total amount of the candidate self-driving-golf-cart driving paths; and an assigning unit, connected to the remainder calculating unit, configured to assign the candidate self-driving-golf-cart driving paths having the number equal to the remainder, as the individual self-driving-golf-cart driving path.

In one embodiment of the present invention, a self-driving-golf-cart driving path central controlling device is provided, wherein the self-driving-golf-cart driving path determining module includes a map building unit that is configured to build an area map covering the self-driving area, and the area map is built according to an electronic map of the self-driving area and topographical features of the self-driving area.

In one embodiment of the present invention, a self-driving-golf-cart driving path central controlling device is provided, wherein the central controlling module is configured to transmit the individual self-driving-golf-cart driving path to each self-driving-golf-cart.

In one embodiment of the present invention, a self-driving-golf-cart driving path central controlling device is provided, wherein the central controlling module includes a wireless transmitting unit that transmits the individual self-driving-golf-cart driving path to each self-driving-golf-cart by wireless transmission.

With the technical means adopted by the present invention, the present invention performs, in a central control manner, control and management on the self-driving-golf-cart driving paths for the self-driving-golf-carts self-driving in the fairway and/or a rough of the golf course such that each self-driving-golf-cart drives on the individual self-driving-golf-cart driving path in the self-driving manner. The present invention (1) determines a plurality of self-driving-golf-cart driving paths inside the self-driving area; (2) assigns an excluded self-driving-golf-cart driving path from the plurality of self-driving-golf-cart driving paths if an excluding assignment is required, wherein the plurality of self-driving-golf-cart driving paths from which the self-driving-golf-cart excluded driving path/paths is/are excluded are defined as selected self-driving-golf-cart driving paths, and the excluded self-driving-golf-cart driving path is optional to be configured to be re-assigned to be the selected self-driving-golf-cart driving path; and (3) determines, from the selected self-driving-golf-cart driving paths, an individual self-driving-golf-cart driving path for each self-driving-golf-cart, such that each self-driving-golf-cart is controlled to drive, in a self-driving manner, on the individual self-driving-golf-cart driving path which is determined for said each self-driving golf-cart. The self-driving-golf-cart driving path central controlling device of the present invention performs above method in a central control manner. The present invention is with merits including saving the cost of caddy fees of the golf course, bringing convenience for golfers by introducing self-driving technology into the golf course, driving the golf-cart to the fairway without damaging the fairway, and able to actively maintain the turf of the fairway. In one embodiment, the self-driving-golf-cart driving path is selected in the probability-evening manner to average the number of the self-driving-golf-carts driving on each self-driving-golf-cart driving path. Therefore, the cart-weight damage on the fairway by the self-driving-golf-cart can be evenly distributed for all self-driving-golf-cart driving paths so as to be able to maintain the fairway (e.g., turf) of the golf course in a best situation and also reduce the self-driving-golf-cart danger caused by the damage of the fairway.

DETAILED DESCRIPTION OF THE PREFERRED EMBODIMENTS

The preferred embodiments of the present invention are described in detail below with reference to FIG. 1 to FIG. 5. The description is used for explaining the embodiments of the present invention only, but not for limiting the scope of the claims.

As shown in FIG. 1 to FIG. 5, a self-driving-golf-cart driving path central controlling device 100 according to one embodiment of the present invention centrally controls a plurality of self-driving-golf-carts C for the purpose of enabling the plurality of self-driving-golf-carts C to self-drive in a self-driving area A, which is a golf course such as a fairway or a rough. The self-driving-golf-cart driving path central controlling device 100 includes a self-driving-golf-cart driving path determining module 1, a self-driving-golf-cart driving path excluding module 2 and a central controlling module 3.

Figure 1:
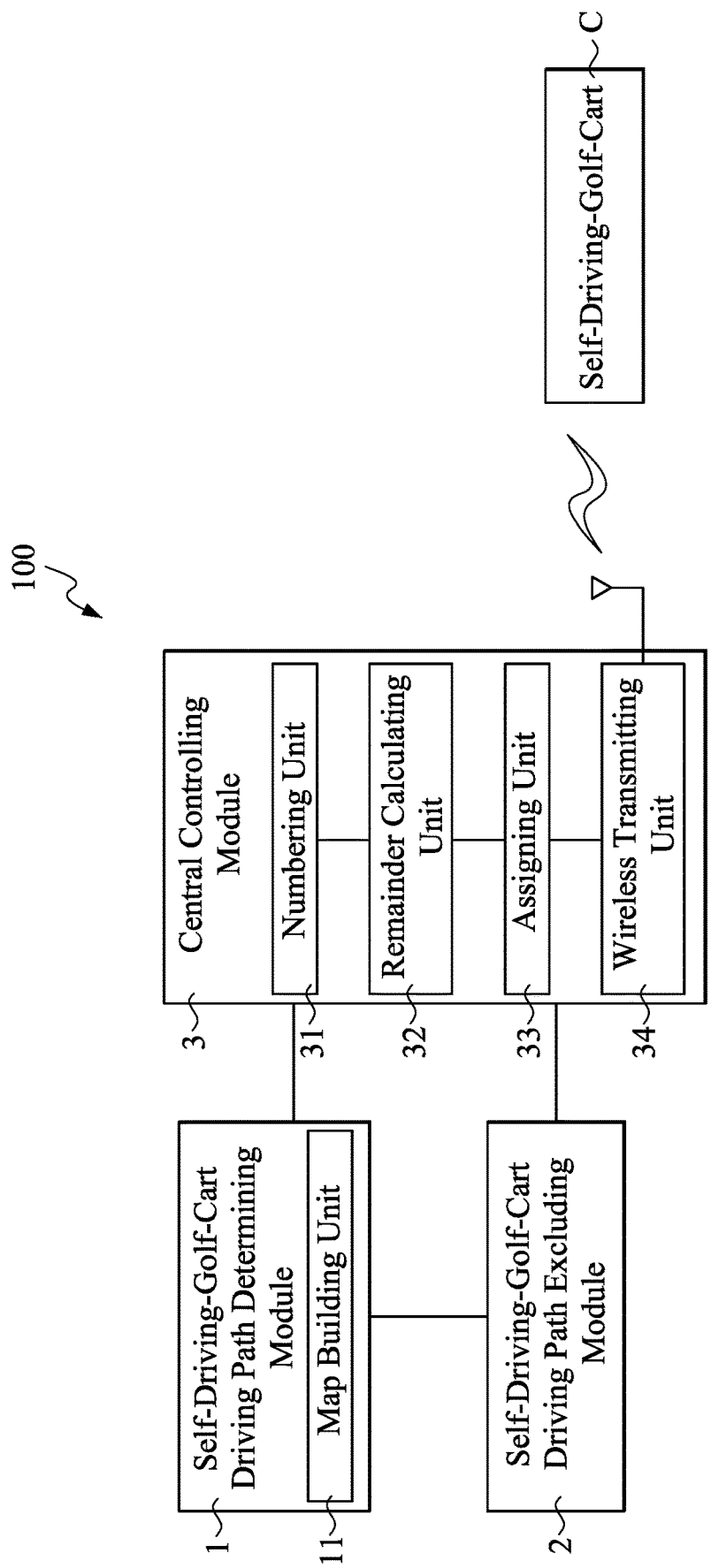
FIG. 1 is a schematic block diagram illustrating a self-driving-golf-cart driving path central controlling device according to an embodiment of the present invention.
Figure 2:
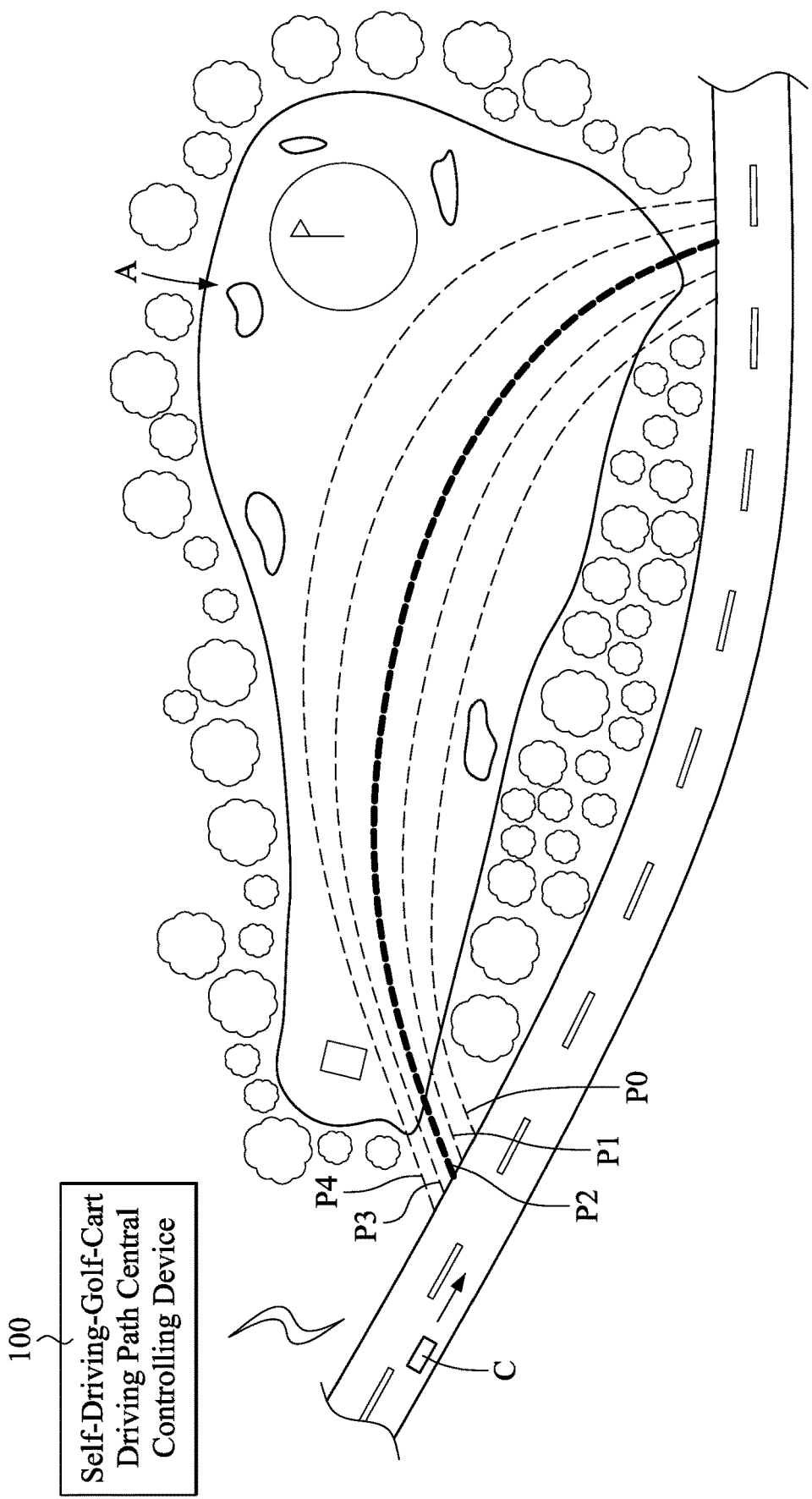
FIG. 2 is a schematic drawing illustrating the self-driving-golf-cart driving path central controlling device according to the embodiment of the present invention when implemented in a golf course.
Figure 3:
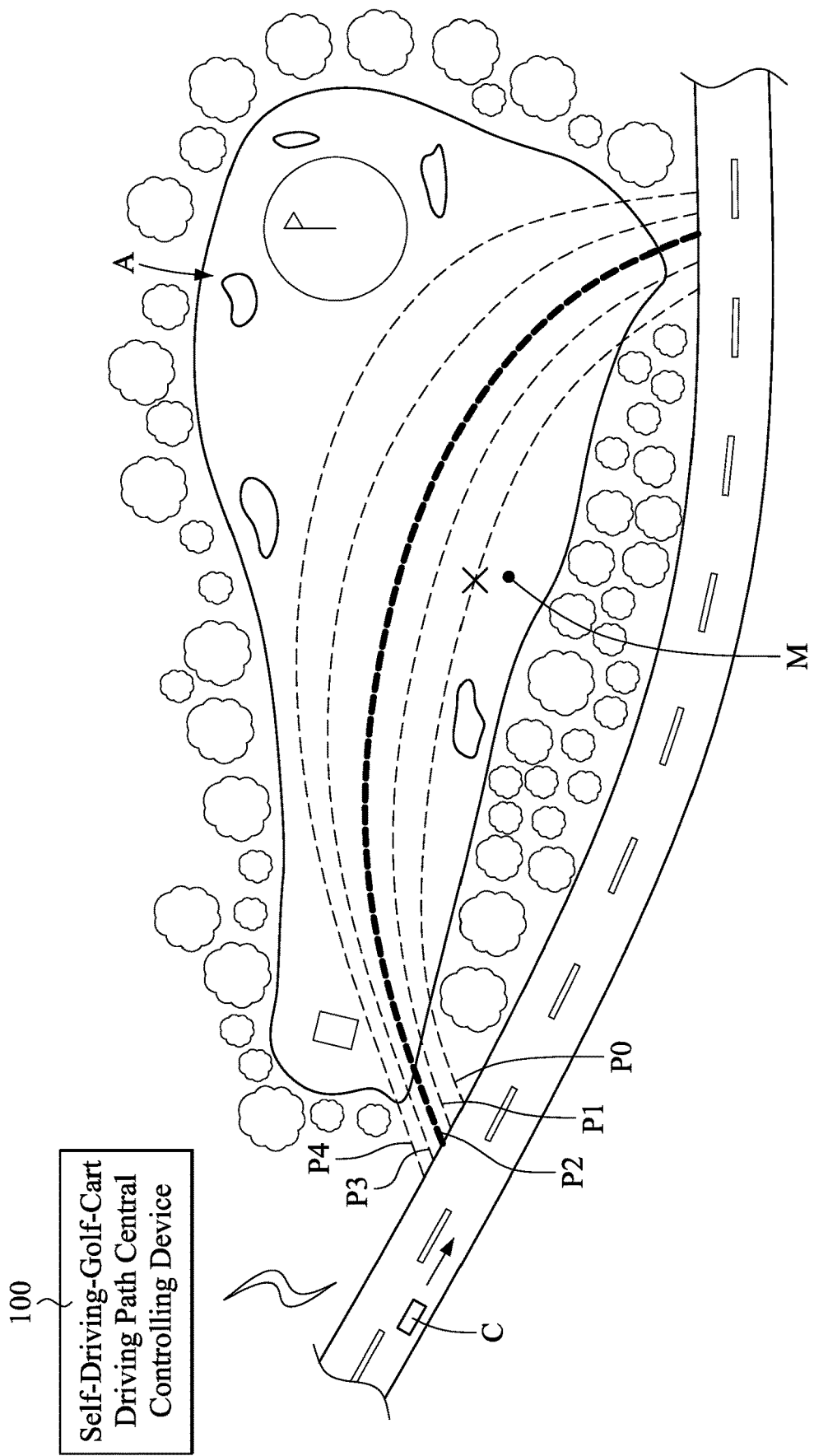
FIG. 3 is a schematic drawing illustrating the self-driving-golf-cart driving path central controlling device according to the embodiment of the present invention when implemented in the golf course.
Figure 4:
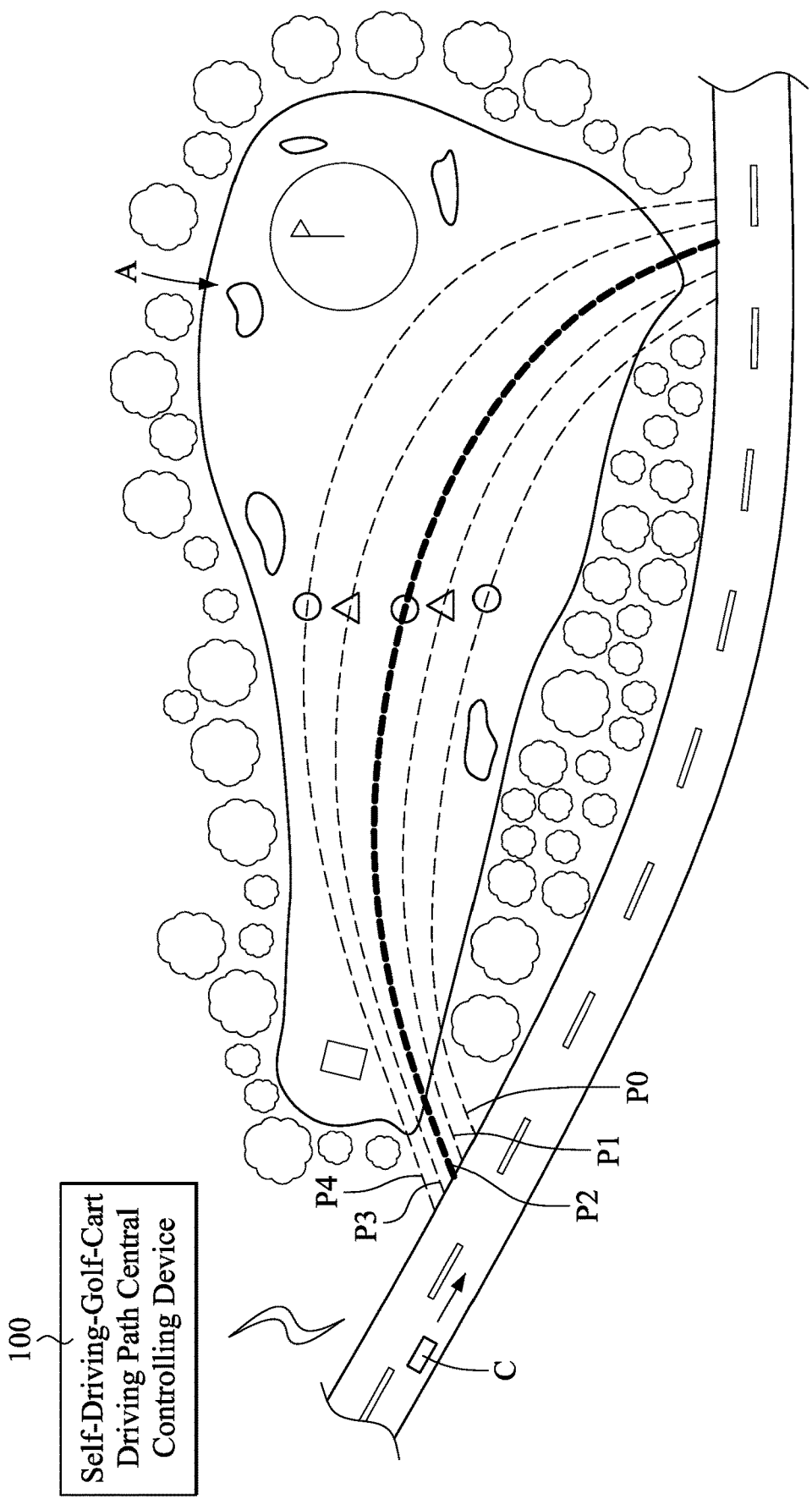
FIG. 4 is a schematic drawing illustrating the self-driving-golf-cart driving path central controlling device according to the embodiment of the present invention when implemented in the golf course.

As shown in FIG. 1 to FIG. 4, the self-driving-golf-cart driving path determining module 1 is configured to determine a plurality of self-driving-golf-cart driving paths P0, P1, P2, P3 and P4 within the self-driving area A, wherein the plurality of self-driving-golf-cart driving paths P0, P1, P2, P3 and P4 are provided such that each self-driving-golf-cart C drives on one of the plurality of self-driving-golf-cart driving paths. Each self-driving-golf-cart driving path may be mapped out according to an area map or according to a practical survey performed by a golf course administrator. In the case that each self-driving-golf-cart driving path is defined according to the area map, the self-driving-golf-cart driving path determining module 1 of the present invention includes a map building unit 11 that is configured to build the area map. As shown in FIG. 2 to FIG. 4, the area map covers the self-driving area A, and the area map is built according to an electronic map of the self-driving area A and topographical features of the self-driving area A. The data of the area map is combined with actual locations, i.e., the golf course, by location information of a global navigation satellite system (GNSS) such that the self-driving-golf-cart C can drive in a self-driving manner according to the area map. In another embodiment, by utilizing practical survey paths obtained by practical survey, e.g., the self-driving-golf-cart driving paths P2 shown in FIG. 2, self-driving-golf-cart driving paths P0, P1, P3 and P4 can be determined within the area map by referring the obtained practical survey paths P2 corresponding to the area map.

As shown in FIG. 1 and FIG. 3, the self-driving-golf-cart driving path excluding module 2, connected to the self-driving-golf-cart driving path determining module 1, is configured to assign an excluded self-driving-golf-cart driving path from the plurality of self-driving-golf-cart driving paths P0, P1, P2, P3 and P4 if an excluding assignment is required (for example, the self-driving-golf-cart driving path P0 is excluded because a construction point M exists as shown in FIG. 3), wherein the plurality of self-driving-golf-cart driving paths from which the self-driving-golf-cart excluded driving path/paths is/are excluded are defined as selected self-driving-golf-cart driving paths (P1, P2, P3 and P4), and the excluded self-driving-golf-cart driving path P0 is optional to be re-assigned to be the selected self-driving-golf-cart driving path (P0, P1, P2, P3 and P4). The self-driving-golf-cart driving path excluding module 2 is configured to assign the excluded self-driving-golf-cart driving path according to the turf status, the weather condition, the seasonal condition, the time, the number of golfers to be in the golf course, and the like. Furthermore, with the change of the turf status, the weather condition, the seasonal condition, the time, the number of golfers to be in the golf course, and the like, the self-driving-golf-cart driving path excluding module 2 may re-assign the excluded self-driving-golf-cart driving path to be the selected self-driving-golf-cart driving path. For example, a self-driving-golf-cart driving path W, not shown, is excluded when a water accumulation is formed on the self-driving-golf-cart driving path W; a self-driving-golf-cart driving path W2, not shown, is excluded when the neighborhood of the self-driving-golf-cart driving path is under construction; a self-driving-golf-cart driving path W2, not shown, is excluded when the self-driving-golf-cart driving path is likely to accumulate water due to rain on the day; the administrator of the golf course may only schedule a small number of the self-driving-golf-cart driving paths to be opened when there are a few visitors on the day; and as shown in FIG. 4, the administrator of the golf course may schedule the odd-numbered self-driving-golf-cart driving paths P1 and P3 (marked by a triangle symbol in FIG. 4) to be used on Mondays, Wednesdays and Fridays, and the even-numbered self-driving-golf-cart driving paths P0, P2 and P4 (marked by a circle symbol in FIG. 4) to be used on Tuesdays, Thursdays, Saturdays and Sundays. The above settings can be changed by an administrator as needed.

Figure 5:
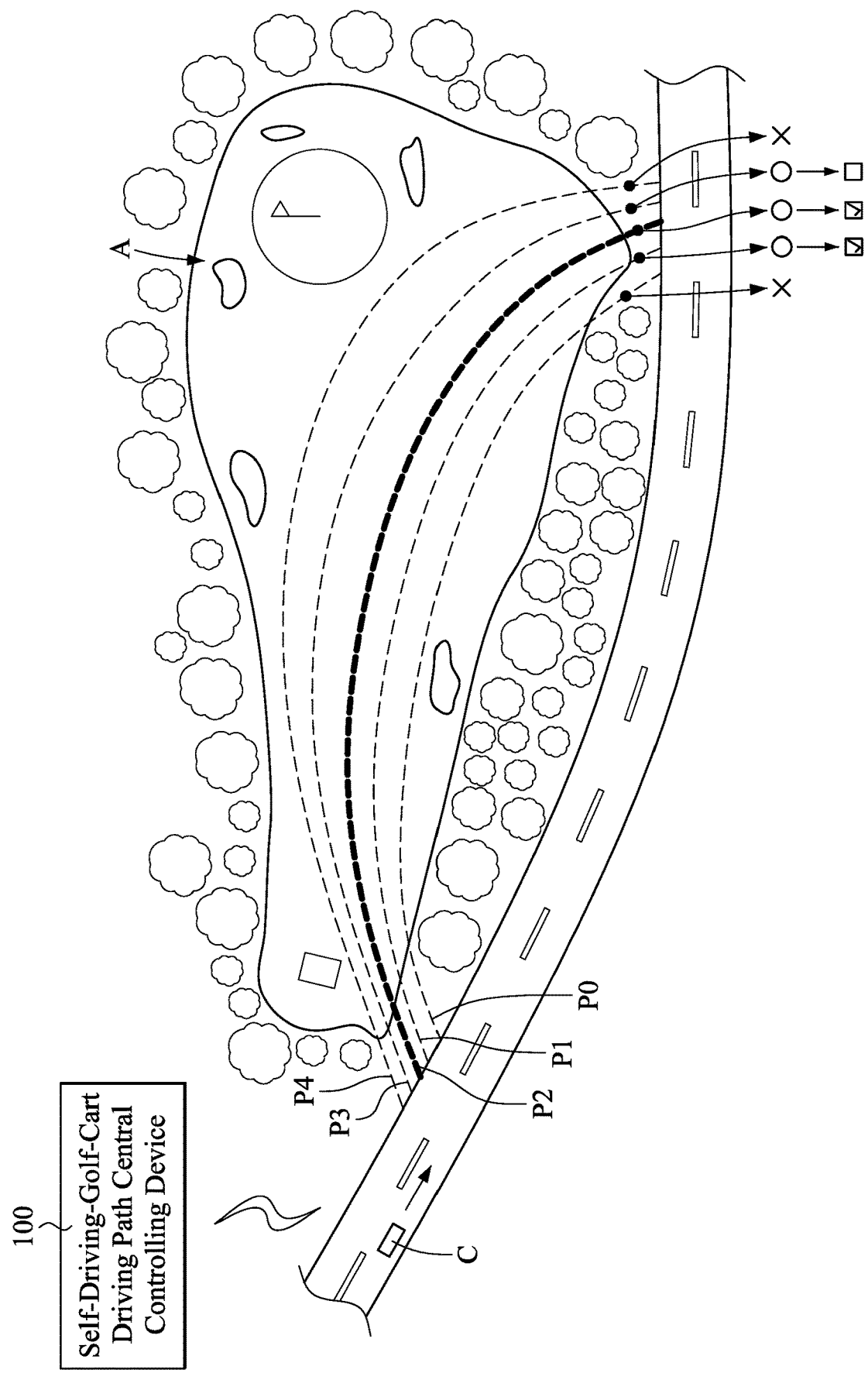
FIG. 5 is a schematic drawing illustrating the self-driving-golf-cart driving path central controlling device according to the embodiment of the present invention when implemented in the golf course.

As shown in FIG. 1, the central controlling module 3, connected to the self-driving-golf-cart driving path determining module 1 and the self-driving-golf-cart driving path excluding module 2, is configured to obtain the selected self-driving-golf-cart driving paths from the self-driving-golf-cart driving path excluding module 2 such that the central controlling module 3 determines, from the selected self-driving-golf-cart driving paths, an individual self-driving-golf-cart driving path for each self-driving-golf-cart C and controls each self-driving-golf-cart C to drive, in a self-driving manner, on the individual self-driving-golf-cart driving path, which is determined for said each self-driving golf-cart C. As shown in FIG. 5, the self-driving-golf-cart driving path determining module 1 determines five self-driving-golf-cart driving paths P0, P1, P2, P3 and P4, the self-driving-golf-cart driving path excluding module 2 excludes the self-driving-golf-cart driving paths P0 and P4 (marked by "x") such that the self-driving-golf-cart driving paths P1, P2 and P3 are the selected self-driving-golf-cart driving paths (marked by "○"), then the central controlling module 3 determines, from the selected self-driving-golf-cart driving paths P1, P2 and P3, one or more individual self-driving-golf-cart driving path, for example, the self-driving-golf-cart driving paths P1 and P2 are selected (marked by "☑") while the self-driving-golf-cart driving paths P3 is not selected (marked by "☐"), and the self-driving-golf-cart driving paths P1 and P2 are determined as the individual self-driving-golf-cart driving path such that each self-driving-golf-cart C drives on the individual self-driving-golf-cart driving path P1 and P2 and does not drive on the self-driving-golf-cart driving path P3.

Furthermore, in this embodiment, the central controlling module 3 is configured to select all or a portion of the selected self-driving-golf-cart driving paths from the selected self-driving-golf-cart driving paths as candidate self-driving-golf-cart driving paths from which the individual self-driving-golf-cart driving path for each self-driving-golf-cart C is selected such that the central controlling module 3 controls each self-driving-golf-cart C to drive, in a self-driving manner, on the individual self-driving-golf-cart driving path determined. Specifically, the central controlling module 3 is configured to select the candidate self-driving-golf-cart driving paths according to a daily self-driving-golf-cart amount and/or a self-driving area maintenance plan. For example, when a day is estimated requiring self-driving-golf-carts in amount up to 50, more self-driving-golf-cart driving paths are required and all selected self-driving-golf-cart driving paths will be determined as the self-driving-golf-cart driving paths (no self-driving-golf-cart driving path is idle) such that all self-driving-golf-cart driving paths P1, P2 and P3 are determined as the self-driving-golf-cart driving paths for each self-driving-golf-cart C on the day. In the case that a day is estimated with a small amount of golfer to play in the golf course, the number of the idle self-driving-golf-cart driving path can be increased. The self-driving area maintenance plan is, for example, a turf maintenance, a bunker maintenance, a pipeline construction, or tree planting in various areas. Accordingly, the amount of the selected self-driving-golf-cart driving paths, i.e., all or only a partial amount, is selected from the selected self-driving-golf-cart driving paths as the self-driving-golf-cart driving paths.

Preferably, in the self-driving-golf-cart driving path central controlling device 100 according to the embodiment of the present invention, the central controlling module 3 is configured to select the self-driving-golf-cart driving path from the candidate self-driving-golf-cart driving paths in a probability-evening manner according to self-driving-golf-cart dispatching information of each self-driving-golf-cart C to be dispatched. Specifically, the self-driving-golf-cart dispatching information could be any kind of information relating to the daily self-driving-golf-cart itself or the dispatching of the daily self-driving-golf-carts, such as, a dispatching number of the self-driving-golf-cart C, a cart number of the self-driving-golf-cart C and a dispatching schedule of the self-driving-golf-cart C. The probability-evening manner is a manner to evenly distribute the number of the self-driving-golf-carts C over all selected self-driving-golf-cart driving paths of the candidate self-driving-golf-cart driving paths. For example, in the case that the total amount of the selected self-driving-golf-cart driving paths of the candidate self-driving-golf-cart driving paths is 4, and the total amount of the self-driving-golf-carts C to be dispatched on the day is 30, the number of the self-driving-golf-carts C determined in the probability-evening manner to drive on each selected self-driving-golf-cart driving path on the day will be 7 or 8 (30/4=7.5). Alternatively, when the total amount of the self-driving-golf-carts C to be dispatched on the day is 50, the number of the self-driving-golf-carts C determined in the probability-evening manner to drive on each selected self-driving-golf-cart driving path on the day will be 12 or 13 (50/4=12.5).

Furthermore, as shown in FIG. 1 and FIG. 2, the probability-evening manner can be implemented in many ways, such as selecting in turn or selecting in random order. In this embodiment, the central controlling module 3 includes a numbering unit 31, a remainder calculating unit 32 and an assigning unit 33. The numbering unit 31, connected to the self-driving-golf-cart driving path determining module 1 and the self-driving-golf-cart driving path excluding module 2, is configured to number each candidate, in order, self-driving-golf-cart driving path of the candidate self-driving-golf-cart driving paths by natural numbers beginning with 0 (i.e., 0, 1, 2, 3 . . . ). The remainder calculating unit 32, connected to the numbering unit 31, is configured to obtain a remainder (e.g., R) of a dispatching number (e.g., M) of the self-driving-golf-cart C divided by a total amount (e.g., N) of the candidate self-driving-golf-cart driving paths (i.e., R=rem(M, N)). The assigning unit 33, connected to the remainder calculating unit 32, is configured to assign the candidate self-driving-golf-cart driving paths having the number equal to the remainder, as the individual self-driving-golf-cart driving path. For example, assuming that the total amount of the candidate self-driving-golf-cart driving paths of the candidate self-driving-golf-cart driving paths is 4 (i.e., N=4), the four candidate self-driving-golf-cart driving paths are numbered by 0, 1, 2 and respectively. The current dispatching number of the self-driving-golf-cart C is 10 (i.e., M=10), a remainder obtained by the formula of "R=rem(10, 4)" is 2 (i.e., R=2). Accordingly, the assigning unit 33 assigns the candidate self-driving-golf-cart driving path number 2 as the individual self-driving-golf-cart driving path for the $10^{th}$ self-driving-golf-cart. When the current dispatching number of the self-driving-golf-cart C is 11 (i.e., M=11), the assigning unit 33 will assign the candidate self-driving-golf-cart driving path number 3 (R=rem(11, 4)=3) as the individual self-driving-golf-cart driving path for the $11^{th}$ self-driving-golf-cart. However, the present invention is not limited to this, any unit capable of performing the selection in the probability-evening manner can be utilized for the central controlling module 3 as long as the number of the self-driving-golf-carts is evenly distributed over all selected self-driving-golf-cart driving paths.

As shown in FIG. 1 and FIG. 2, in the self-driving-golf-cart driving path central controlling device 100 according to the embodiment of the present invention, the central controlling module 3 is configured to transmit the individual self-driving-golf-cart driving path to each self-driving-golf-cart C. Preferably, the central controlling module 3 includes a wireless transmitting unit 34 that transmits the individual self-driving-golf-cart driving path to each self-driving-golf-cart C by wireless transmission.

With above structure, the self-driving-golf-cart driving path central controlling device 100 according to the present invention can effectively control and manage the self-driving-golf-cart driving paths for the self-driving-golf-carts C such that each self-driving-golf-cart C can drive, in a self-driving manner, on the individual self-driving-golf-cart driving path. In a preferred embodiment, the self-driving-golf-cart driving path is selected in the probability-evening manner so as to average the number of the self-driving-golf-carts C driving on each self-driving-golf-cart driving path. Therefore, the cart-weight damage on the fairway by the self-driving-golf-cart C can be evenly distributed for all self-driving-golf-cart driving paths so as to be able to maintain the fairway (e.g., turf) of the golf course in a best situation and also reduce the self-driving-golf-cart danger caused by the damage of the fairway.

The above description is only an explanation of the preferred embodiments of the present invention. One having ordinary skill in the art can make various modifications according to the above description and the claims defined below. However, those modifications shall still fall within the scope of the present invention.

What is claimed is:

1. A self-driving-golf-cart driving path central controlling device whose central controlling module centralizing controls a plurality of self-driving-golf-carts to self-drive in a self-driving area, the self-driving area is a fairway of a golf course, the self-driving-golf-cart driving path central controlling device comprising:

a self-driving-golf-cart driving path storing module, whose memory stores data of a plurality of self-driving-golf-cart driving paths within the self-driving area transmitted from the central controlling module, wherein the data of the plurality of self-driving-golf-cart driving paths are transmitted to each self-driving-golf-cart such that the central controlling device operates each self-driving-golf-cart self-drive on an area of one of the plurality of self-driving-golf-cart driving paths but not self-drive on an area other than the self-driving-golf-cart driving path, according to the data of the plurality of self-driving-golf-cart driving paths;

a self-driving-golf-cart driving excluded path storing module, connected to the self-driving-golf-cart driving path storing module and whose memory stores a data of self-driving-golf-cart driving excluded path and a data of self-driving-golf-cart driving selected paths transmitted from the central controlling module, wherein the data of self-driving-golf-cart driving excluded path is data assigned by the central controlling module from the data of the plurality of self-driving-golf-cart driving paths according to a data of self-driving area maintenance plan, wherein the data of the plurality of self-driving-golf-cart driving paths other than the data of the self-driving-golf-cart driving excluded path/paths is determined by the central controlling module as the data of self-driving-golf-cart driving selected paths, and the data of self-driving-golf-cart driving excluded path is optional to be re-assigned by the central controlling module to be the data of self-driving-golf-cart driving selected path according to the data of self-driving area maintenance plan; and the central controlling module, connected to the self-driving-golf-cart driving path storing module and the self-driving-golf-cart driving excluded path storing module and accessing the memory of the self-driving-golf-cart driving path storing module and memory of the self-driving-golf-cart driving excluded path storing module, the central controlling module being configured to determine the data of self-driving-golf-cart driving selected paths from the self-driving-golf-cart driving excluded path storing module such that the central controlling module assigns, for each self-driving-golf-cart, one data from the data of self-driving-golf-cart driving selected paths to be a data of individual self-driving-golf-cart driving path according to, in a probability-evening manner, a data of daily self-driving-golf-cart amount and a self-driving-golf-cart dispatching information of each self-driving-golf-cart to be dispatched such that the central controlling module controls each self-driving-golf-cart to drive, in a self-driving manner, on an individual self-driving-golf-cart driving path according to the data of individual self-driving-golf-cart driving path.

2. The self-driving-golf-cart driving path central controlling device as claimed in claim 1, wherein the central controlling module is configured to determine all or a portion of the data of self-driving-golf-cart driving selected paths to be a data of self-driving-golf-cart driving candidate paths according to, in a probability-evening manner, a data of daily self-driving-golf-cart amount and a self-driving-golf-cart dispatching information of each self-driving-golf-cart to be dispatched, and the central controlling module is configured to assign, for each self-driving-golf-cart, one data from the data of self-driving-golf-cart driving candidate paths o be the data of individual self-driving-golf-cart driving path such that the central controlling module controls each self-driving-golf-cart to drive, in a self-driving manner, on the individual self-driving-golf-cart driving path according to the data of individual self-driving-golf-cart driving path.

3. The self-driving-golf-cart driving path central controlling device as claimed in claim 2, wherein the central controlling module is configured to assign the data of self-driving-golf-cart driving candidate path in a probability-evening manner according to the self-driving-golf-cart dispatching information of each self-driving-golf-cart to be dispatched.

4. The self-driving-golf-cart driving path central controlling device as claimed in claim 3, wherein the central controlling module includes:

a numbering unit, connected to the self-driving-golf-cart driving path storing module and the self-driving-golf-cart driving excluded path storing module, configured to number each self-driving-golf-cart driving candidate path in the data of self-driving-golf-cart driving candidate paths by natural numbers beginning with 0;

a remainder calculating unit, connected to the numbering unit, configured to obtain a remainder of a dispatching number of the self-driving-golf-cart divided by a total amount of the candidate self-driving-golf-cart driving paths in the data of self-driving-golf-cart driving candidate paths; and an assigning unit, connected to the remainder calculating unit, configured to assign the self-driving-golf-cart driving candidate paths, in the data of self-driving-golf-cart driving candidate paths, having the number equal to the remainder, as the data of the individual self-driving-golf-cart driving path.

5. The self-driving-golf-cart driving path central controlling device as claimed in claim 1, wherein the self-driving-golf-cart driving path storing module includes a map building unit that is configured to build an area map covering the self-driving area, and the area map is built according to an electronic map of the self-driving area and topographical features of the self-driving area.

6. The self-driving-golf-cart driving path central controlling device as claimed in claim 1, wherein the central controlling module includes a wireless transmitting unit that transmits the data of the individual self-driving-golf-cart driving path to each self-driving-golf-cart by wireless transmission.

* * * * *